May 15, 1945.  C. J. STAUD  2,376,202
RETARDING DIFFUSION OF SENSITIZING DYES
Filed May 27, 1943
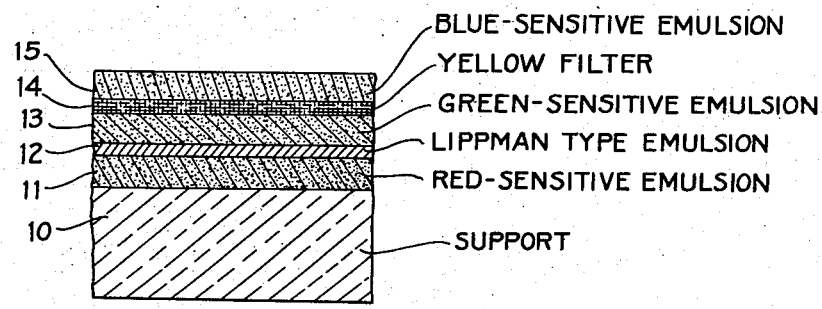
CYRIL J. STAUD
*INVENTOR*

Patented May 15, 1945

2,376,202

UNITED STATES PATENT OFFICE 2,376,202

RETARDING DIFFUSION OF SENSITIZING DYES

Cyril J. Staud, Rochester, N. Y., assignor to Eastman Kodak Company, Rochester, N. Y., a corporation of New Jersey Application May 27, 1943, Serial No. 488,698

6 Claims. (Cl. 95—2)

This invention relates to color photography and particularly to a method for retarding or preventing the diffusion of optical sensitizing dyes.

In the usual type of multi-layer photographic material the separate silver halide emulsion layers are sensitized to the various spectral regions with optical sensitizing dyes. Such dyes are believed to be adsorbed to the silver halide grains but this adsorption is not complete in every case and the dyes are not retained in the emulsion in which they are originally incorporated. When the sensitizing dye diffuses from the layer in which it is incorporated and passes into an adjoining sensitive layer, it becomes adsorbed to the silver halide grains in that layer and thereby causes the adjoining layer to record light which it was not intended to record. The diffusion of the sensitizing dyes, therefore, destroys accurate color rendition by the multi-layer system. A great many optical sensitizing dyes are known which afford fairly satisfactory results as regards their sensitizing properties but which diffuse from one layer to another in appreciable amounts. It would be desirable to take advantage of the sensitizing properties of such dyes while eliminating the undesirable results brought about by their diffusion.

It is, therefore, the principal object of the present invention to provide a method for reducing the tendency of optical sensitizing dyes to wander from one silver halide layer to another. A further object is to provide a novel multi-layer material in which the color rendition is not degraded by the diffusion of the sensitizing dye.

These objects are accomplished according to my invention by coating a layer of a fine grain, unfogged, slow-speed, silver halide emulsion adjacent a silver halide emulsion layer containing a sensitizing dye which diffuses, or between the sensitized layer and another silver halide emulsion layer into which the optical sensitizing dye may diffuse.

In the accompanying drawing the single figure is a sectional view of a film made according to my invention.

Multi-layer photographic material consists of a support having two or more emulsion layers coated in superposed relation upon it. These emulsion layers are generally sensitized with optical sensitizing dyes to various regions of the visible spectrum. The customary three-layer material has adjacent the support a red-sensitive emulsion and this is followed in order by a green-sensitive emulsion and an unsensitized emulsion which is blue-sensitive. The optical sensitizing dyes in either the red-sensitive emulsion or the green-sensitive emulsion may diffuse into adjacent emulsion layers and cause them to record light which they were not intended to record. For example, the optical sensitizing dye in the red-sensitive emulsion layer might diffuse into the green-sensitive emulsion layer or into the blue-sensitive emulsion layer. The optical sensitizing dye in the green-sensitive emulsion layer may diffuse either into the red-sensitive emulsion layer or into the blue-sensitive emulsion layer. Optical sensitizing dyes which diffuse to any extent to adjacent layers cannot be used in practice since it is important that the sensitivity of the various layers be well defined.

I have found that the introduction of a very fine grain, slow-speed, unfogged, silver halide emulsion as an interlayer between any two of the emulsion layers of a multi-layer material is effective in reducing the tendency of the optical sensitizing dyes to contaminate adjacent layers. The emulsion used in this interlayer is preferably a fine-grain gelatino-silver halide emulsion of the modified Lippmann type, which is very satisfactory for preventing the optical sensitizer from reaching the next color-sensitive layer. While I do not postulate the mechanism of this action, it appears probable that the diffusing dye is adsorbed to the very fine particles of the silver halide in the interlayer and the dye thereby prevented from reaching the adjoining color image layer.

The interlayer which I propose to use may be located between the red-sensitive and green-sensitive emulsion layers of the customary three-layer film or between the green-sensitive and blue-sensitive layers of such film. The three-layer material ordinarily has a yellow filter layer in or beneath the top blue-sensitive layer and the interlayer which I propose to use may contain the yellow filter dye. The modified Lippmann emulsions of the type which I propose to use are sufficiently fine grained that they are quite transparent and, therefore, do not decrease the resolving power or definition of the image in the underlying layers. They absorb only blue and violet light, and being placed, according to my invention, below the yellow filter layer, they do not decrease the speed of the green-sensitive and red-sensitive emulsion layers lying below them. They are sufficiently insensitive to light that they are not rendered developable in the usual length of time during which the film is exposed and, therefore, no metallic silver is produced upon development. The silver halide in the interlayer is readily removable during ordinary fixing of the material and, therefore, requires no extra step during processing for its removal.

The following specific examples will serve to illustrate my invention:

Example 1

A moderate speed emulsion suitable for use in color photography was sensitized to red light with 1',2-diethylthia-4'-carbocyanine iodide in a concentration of 100 milligrams of dye per 16,000 cc. of emulsion. Over this was coated in one instance a clear gelatin layer and in the other case a modified Lippmann type emulsion coated of the same thickness as the gelatin layer. Above these layers was then coated a blue-sensitive emulsion similar to that used in the optically sensitized layer, but without the sensitizing dye.

When the resulting films were exposed from the front in a wedge spectrograph, developed and fixed, it was found that in the case where the plain gelatin interlayer was used a considerable amount of image was obtained in the top emulsion in the red-sensitive region, whereas in the coating containing the modified Lippmann type emulsion in the interlayer the image in the red region of the spectrum was confined to the first coated or lowermost emulsion layer. This clearly indicated that the interlayer of Lippmann type emulsion had prevented diffusion of the optical sensitizing dye from the lower layer into the upper layer.

Example 2

The procedure described in Example 1 was followed, using, instead of the red-sensitizing dye indicated in Example 1, a green sensitizer, 3-ethyl-5-(3-methyl-2-thiazolinylidene ethylidene)-rhodanine in the first layer. The results were similar to those obtained in Example 1.

A suitable fine-grain, unfogged, slow-speed silver halide emulsion for use in the interlayers according to my invention may be prepared as follows:

To one liter of 10% gelatin at approximately 30° C. are added simultaneously ½ liter of 20% silver nitrate solution and ½ liter of 14% potassium bromide solution containing 0.2% potassium iodide. These are added over a period of approximately 5 minutes either continuously or intermittently. The temperature is maintained at 30° C. during this time. The material is then cooled, setting it to a firm gel, and shredded. It is washed briefly, in a manner well known in the art, to remove soluble salts and is again melted and is ready for coating.

My invention will now be described by reference to the accompanying drawing.

As shown in the drawing, 10 is a support of any suitable material such as cellulose nitrate, cellulose acetate, paper, pigmented cellulose ester or synthetic resin having thereon a red-sensitive emulsion layer 11, a Lippmann type emulsion interlayer 12, according to my invention, a green-sensitive emulsion layer 13, a yellow filter layer 14 and a blue-sensitive emulsion layer 15. As pointed out above, the layer 14 may also contain a fine grain slow speed emulsion according to my invention if it is found that the optical sensitizing dye in the green-sensitive layer 13 diffuses into the layer 15. The emulsion layers 11, 12 and 15 are the usual gelatino-silver halide emulsion layers customarily used in multi-layer photographic elements. These emulsions may also consist of silver halide dispersed in other water-permeable colloidal materials such as cellulose esters or ethers or synthetic resins. The emulsion layers 11, 13 and 15 may also contain color-forming compounds as disclosed, for example, in Mannes and Godowsky U. S. Patent 2,304,940, granted December 15, 1942.

It will be understood that the examples and modifications included herein are illustrative only and that my invention is to be taken as limited only by the scope of the appended claims.

I claim:

1. The method of retarding diffusion of optical sensitizing dyes from the grains of one photographic silver halide emulsion layer to the grains of another photographic silver halide emulsion layer coated in proximity to the first layer, at least one of said emulsion layers containing an optical sensitizing dye having a tendency to diffuse, which comprises incorporating as a layer between said silver halide emulsion layers, a layer of an unfogged silver-halide emulsion, said last-mentioned layer being sufficiently fine-grained that it is transparent and does not decrease the resolving power and definition of any underlying layer, and being sufficiently insensitive to light that it is not rendered developable in the usual length of time during which the film is exposed.

2. The method of retarding diffusion of optical sensitizing dyes from a photographic silver halide emulsion layer sensitized to a wave-length of light longer than blue with said sensitizing dyes, to another photographic silver halide emulsion layer sensitive to a different spectral region and coated in proximity to said first-mentioned emulsion layer, at least one of said layers being sensitized with a dye having a tendency to diffuse, which comprises incorporating as a layer between said emulsion layers, a layer of an unfogged silver bromide emulsion, said last-mentioned layer being sufficiently fine-grained that it is transparent and does not decrease the resolving power and definition of any underlying layer, and being sufficiently insensitive to light that it is not rendered developable in the usual length of time during which the film is exposed.

3. The method of retarding diffusion of the optical sensitizing dye from a red-sensitive gelatino-silver halide emulsion layer sensitized with such dye, to a superposed gelatino-silver halide layer sensitive to a spectral region other than red, at least one of said layers being sensitized with a dye having a tendency to diffuse, which comprises incorporating between said sensitive layers, a layer of an unfogged gelatino-silver bromide emulsion, said last-mentioned layer being sufficiently fine-grained that it is transparent and does not decrease the resolving power and definition of any underlying layer, and being sufficiently insensitive to light that it is not rendered developable in the usual length of time during which the film is exposed.

4. A multi-layer photographic element in which the tendency of optical sensitizing dyes to diffuse into adjacent sensitive layers is reduced, comprising a plurality of silver halide emulsion layers sensitized to different spectral regions, at least one of said emulsion layers containing an optical sensitizing dye having a tendency to diffuse, and between said last-mentioned layer and another, differently-sensitive layer, a layer of an unfogged silver halide emulsion, said last-mentioned layer being sufficiently fine-grained that it is transparent and does not decrease the resolving power and definition of any underlying layer, and being sufficiently insensitive to light that it is not rendered developable in the usual length of time during which the film is exposed.

5. A multi-layer photographic element in which the tendency of optical sensitizing dyes to diffuse into adjacent sensitive layers is reduced, comprising at least two superposed gelatino-silver halide emulsion layers sensitive to different regions of the visible spectrum, at least one of which layers contains an optical sensitizing dye having a tendency to diffuse into said superposed layer, and between said layers a layer of an unfogged silver bromide emulsion, said last-mentioned layer being sufficiently fine-grained that it is transparent and does not decrease the resolving power and definition of any underlying layer, and being sufficiently insensitive to light that it is not rendered developable in the usual length of time during which the film is exposed.

6. A multi-layer photographic element in which the tendency of optical sensitizing dyes to diffuse into adjacent sensitive layers is reduced, comprising three superposed gelatino-silver halide emulsion layers sensitive respectively to the blue, green, and red spectral regions, the red-sensitive layer being sensitized with an optical sensitizing dye having a tendency to diffuse into another of said sensitive layers, and between said red-sensitive layer and an adjacent sensitive layer, a layer of an unfogged gelatino-silver bromide emulsion, said last-mentioned layer being sufficiently fine-grained that it is transparent and does not decrease the resolving power and definition of any underlying layer, and being sufficiently insensitive to light that it is not rendered developable in the usual length of time during which the film is exposed.

CYRIL J. STAUD.